United States Patent
Christensen et al.

(10) Patent No.: US 7,185,083 B2
(45) Date of Patent: Feb. 27, 2007

(54) METHOD AND APPARATUS FOR IDENTIFYING AN I/O NETWORK IN A PROCESS CONTROL SYSTEM

(75) Inventors: Dan Dean Christensen, Austin, TX (US); Steven Lee Dienstbier, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 785 days.

(21) Appl. No.: 09/761,922

(22) Filed: Jan. 17, 2001

(65) Prior Publication Data

US 2002/0095515 A1    Jul. 18, 2002

(51) Int. Cl.
 *G06F 15/173*   (2006.01)
 *G06F 11/00*    (2006.01)
(52) U.S. Cl. ............ 709/224; 709/223; 370/245; 714/31
(58) Field of Classification Search ........ 709/249, 709/250, 212, 223–224; 700/17, 2, 20, 19, 700/24; 710/33, 38, 31; 370/245; 714/31
See application file for complete search history.

(56) References Cited

U.S. PATENT DOCUMENTS

| | | | |
|---|---|---|---|
| 5,818,347 A * | 10/1998 | Dolan et al. | 340/825.52 |
| 5,980,078 A * | 11/1999 | Krivoshein et al. | 700/1 |
| 6,044,401 A * | 3/2000 | Harvey | 709/225 |
| 6,405,103 B1 * | 6/2002 | Ryan et al. | 700/275 |
| 6,532,217 B1 * | 3/2003 | Alkhatib et al. | 370/252 |
| 6,735,619 B1 * | 5/2004 | Sawada | 709/212 |
| 6,880,000 B1 * | 4/2005 | Tominaga et al. | 709/220 |

FOREIGN PATENT DOCUMENTS

| | | |
|---|---|---|
| JP | 01-272248 | 10/1989 |
| JP | 05-153148 | 6/1993 |

OTHER PUBLICATIONS

Harry Newton, Newton's Telecom Dictionary 18th Updated and Expand Edition, CMP Books, 18th, p. 574.*
Wolf et al., Tags for High Performance Active Network, 2000, IEEE, pp. 37-44.*
Engels et al., THe Networked Physical World: An Automated Identification Architecture, 2000, IEEE, pp. 76-77.*
Notice of the Reasons of Rejection issued in 2002-007415 application by the Japanese Patent Office on Apr. 11, 2006 (with English translation).

* cited by examiner

Primary Examiner—William Vaughn
Assistant Examiner—Michael Delgado
(74) Attorney, Agent, or Firm—Marshall, Gerstein & Borun LLP (57) ABSTRACT

A network identification system for use in a process control system creates and stores a unique network identification tag for input/output networks in the process control system. During the configuration process, each process controller is assigned a unique controller identification tag. In addition, each input/output device installed on each process controller is assigned a device identification tag. The network identification system creates a network identification tag for an input/output network by concatenating and combining the unique controller identification tag and the device identification tag. The network identification system may be configured to periodically transmit the network identification tag or to provide the network identification tag is response to a request for identification.

60 Claims, 2 Drawing Sheets

METHOD AND APPARATUS FOR IDENTIFYING AN I/O NETWORK IN A PROCESS CONTROL SYSTEM

FIELD OF THE INVENTION

The invention relates generally to process control systems and, more specifically, to a system and method for identifying a selected input/output network in a process control system.

DESCRIPTION OF THE RELATED ART

Large scale process control systems are typically employed to control complex manufacturing and refining processes such as those involved in the production of chemical and petroleum products. Advances in technology have led to the decentralization of process control functions within the process control industry. The use of distributed process control systems that employ multiple communicatively coupled process controllers to coordinate and implement process control functions are becoming increasingly commonplace. Such process controllers are typically communicatively coupled to one or more host or operator stations and to multiple field devices which are generally disposed throughout various locations within a plant facility. The operator station provides an operator with an interface, such as a graphical user interface, to monitor and manipulate the process control system. Field devices generally measure and process control parameters and may, for example, include sensors such as temperature, pressure and flow rate sensors as well as control elements such as valves and switches. The process controllers typically control the operation of the field devices to implement process control functions.

Distributed process control systems typically include multiple process controllers communicatively coupled via a local network, such as an area controlled network (ACN). The process controllers are communicatively coupled to local field devices via input/output (I/O) interface cards on a local I/O bus. In some cases, an I/O interface card is communicatively coupled to one or more I/O carriers with each I/O carrier further supporting one or more I/O interface cards and each of the I/O interface cards further supporting one or more remote field devices or additional I/O interface cards.

Different remote I/O interface cards may also be used to support different communication protocols. Examples of such communication protocols include Foundation® Fieldbus, HART®, PROFIBUS®, WORLDFIP®, LONWORKS®, Device-Net® and CAN protocols. Providing support for different protocols permits the incorporation of field devices developed by different manufacturers into a single process control system. As can be seen, a single process control system may potentially include multiple independent networks and may support multiple communication protocols.

Field devices and I/O devices are often removed from a process control system for replacement or as part of routine maintenance procedures. Such field devices and I/O devices are typically already configured for operation within a specific I/O network within the process control system.

Likewise, new field devices are often added to an existing process control system. New local field devices may be connected to local I/O interface cards on a local I/O bus for a selected process controller. Adding new remote field devices often requires the incorporation of additional I/O carriers to support the new field devices. In those cases where different I/O networks supporting different communication protocols are under the control of a single process controller, it is important that the new device be connected to a compatible I/O network under the control of the appropriate process controller.

The use of multiple independent networks in a distributed process control system typically requires the use of extensive cabling which is often similar if not identical. This fact increases the possibility that an I/O device or field device intended for connection on a specific I/O network under the control of a specific process controller may be inadvertently connected to an alternative I/O network using the same or different communication protocol or even a non-I/O network.

Prior art methods to decrease errors in wiring have involved the assignment of a local device tag to I/O interface cards on local I/O buses by a process controller. Typically, upon the installation of an I/O interface card, in a specific slot on a local I/O bus, the associated process controller assigns a device tag to the I/O interface card based on the I/O slot occupied by the I/O interface card. For example, if the I/O interface card is installed in slot six of a local I/O bus, the I/O interface card may be assigned a tag such as "C6." However the use of multiple process controllers in distributed process control systems has diminished the effectiveness of this prior art technique. For example, if a process control system includes a total of ten process controllers, each of which includes an I/O interface card coupled via a slot six on a local I/O bus, such a process control system will include ten I/O interface cards each of which will be identified by a device tag "C6."

As distributed process control systems including a large number of distinct I/O devices and I/O networks become increasingly common, mistakes in cabling may lead to increases in production delays and plant facility downtime. The use of remote I/O devices such as I/O carriers further increases the possibility of wiring mistakes. Incorrect device connections may require plant personnel to perform diagnostic utilities which are often implemented in operator workstations that are located at some distance from the device connection site. Corrective procedures associated with the incorrect wiring of I/O devices and field devices often prove to be time consuming and costly.

SUMMARY OF THE INVENTION

A method and apparatus for identifying an I/O network in a process control system creates a unique network identification tag for each of one or more of the I/O networks in the process control system. During the configuration process, each process controller may be assigned a unique controller identification tag. In addition, each I/O device associated with each process controller may be assigned a device identification tag. For each I/O network, the controller identification tag for the process controller associated with the I/O network and the device identification tags for the I/O devices associated with the I/O network may be used to create a unique network identification tag. The network identification tag may be stored in the I/O device associated with the I/O network. The I/O device may be configured to periodically transmit the network identification tag on its I/O network or may be configured to transmit the network identification tag in response to a request for identification.

When plant personnel wish to install or replace an I/O device, such as an I/O carrier, or a field device on a selected I/O network in the process control system, a diagnostics tool may be used to determine whether a selected I/O network is the correct I/O network prior to installing the I/O device or the field device. Upon the selection of an I/O network, the diagnostics tool is communicatively coupled to the selected I/O network. Depending on the configuration of the I/O device associated with the I/O network, the diagnostics tool may be adapted to either listen for the I/O network's network identification tag or to issue a request for identification data on the I/O network. Upon receipt of the network identification tag over the I/O network, the diagnostics tool generates an output identifying the I/O network. The output may be in the form of a display showing the network identification tag, the location of the I/O network within a configuration diagram or list, etc. The diagnostics tool may be configured to enable a user to provide a network designation identifying the I/O network that the user is seeking to locate. In this case, upon the selection of an I/O network, the diagnostics tool compares the user provided network designation with the received network identification tag to determine whether the correct I/O network has been located.

DESCRIPTION OF THE PREFERRED EMBODIMENTS

Figure 1:
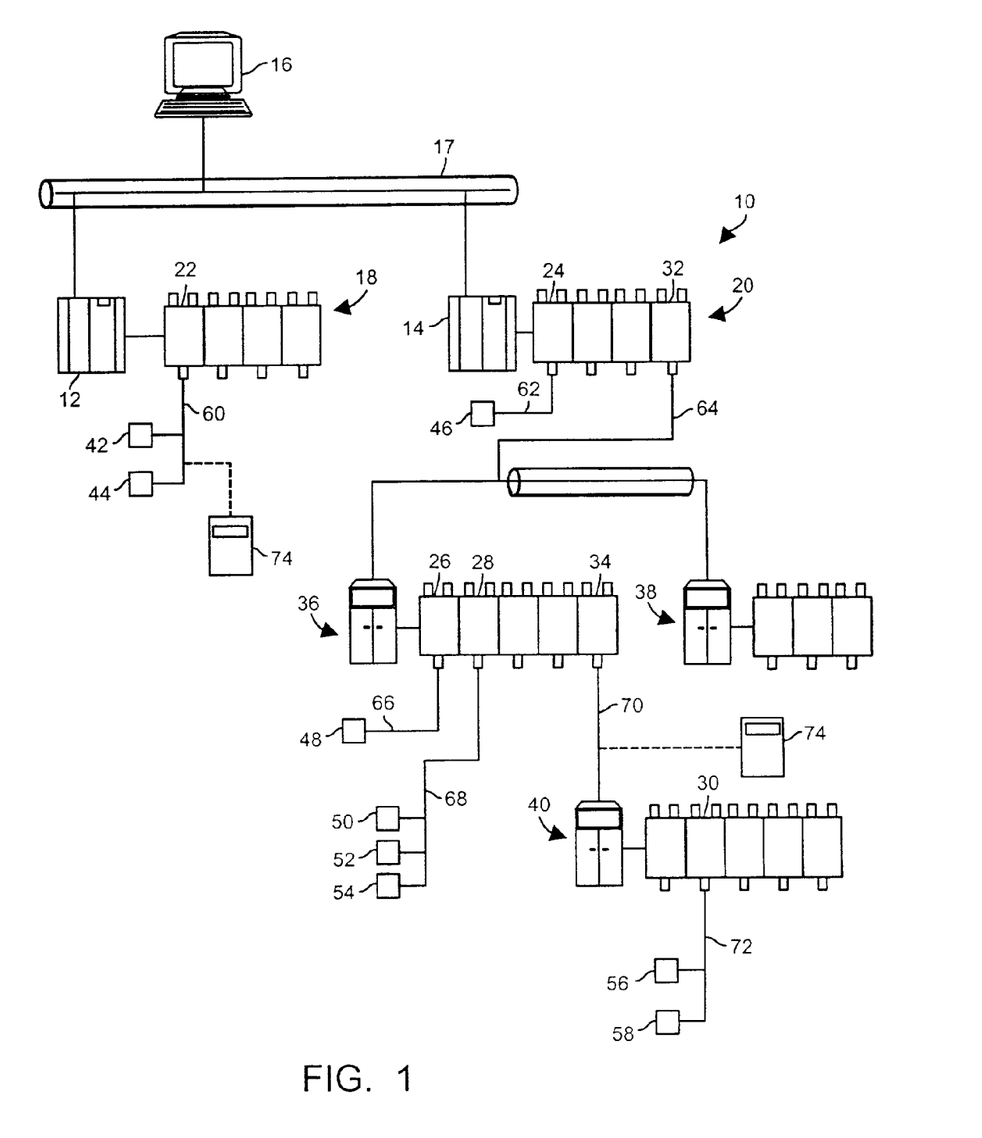
FIG. 1 is a block diagram of a process control system in which a diagnostics tool may be used to locate a selected I/O network.

Referring now to FIG. 1, a process control system 10 generally includes one or more process controllers 12, 14 communicatively coupled to a user interface 16, such as an operator station, via a central network 17. The central network 17 may be an ethernet system such as, for example, an Area Control Network (ACN), or any other desired type of network. The process controllers 12, 14 may be, for example, Delta V™ controllers, sold by Fisher-Rosemount Systems, Inc. or any other desired controllers. The operator station 16 may comprise any suitable personal computer or workstation.

Different types of input/output devices (I/O), such as I/O buses 18, 20 or backplanes, I/O interface cards 22–34, and I/O carriers 36–40 provide communicative coupling between the field devices 42–58 and the process controllers 12, 14. I/O networks 60–72 are used to provide communicative coupling between different I/O devices 32–40 or between I/O devices 22–30 and field devices 42–58. For example, each of the I/O interface cards 22–34 is associated with an I/O network 60–72. In the case of the I/O interface cards 22–30, the I/O networks 60, 62, 66, 68, 72 provide communicative coupling between the I/O interface cards 22–30 and associated field devices 42–58. The I/O interface cards 32, 34 are communicatively coupled to associated I/O carriers 36–40 via the I/O networks 64, 70. The I/O networks 60–72 may be digital or analog busses or non-busses capable of supporting single or multiple field devices 42–58 or single or multiple I/O carriers 36–40. For example, the I/O interface card 24, associated with the I/O network 62, supports the single field device 46 while the I/O interface card 22, associated with the I/O network 60, supports multiple field devices 42, 44.

As mentioned above, the process controllers 12, 14 are communicatively coupled to the field devices 42–58 via one or more I/O devices using I/O networks 60–72. For example, the process controller 12 is connected to the I/O bus 18 and the process controller 14 is connected to the I/O bus 20. Each of the I/O busses 18, 20 is adapted to accommodate one or more I/O devices, such as the I/O interface cards 22, 24, 32. For example, the local field devices 42, 44 are connected on the I/O network 60 that provides communicative coupling to the process controller 12 via the I/O interface card 22. Similarly, the local field device 46 is connected on the I/O network 62 that provides communicative coupling with the process controller 14 via the I/O interface card 24.

The I/O interface cards 26–34 and the I/O carriers 36–40 are used to provide communicative coupling between the remote field devices 48–58 and the process controllers 12, 14 using the I/O networks 64–72. For example, the process controller 14 is connected to the I/O interface card 32 disposed on the I/O bus 20. The I/O carriers 36, 38 are communicatively coupled to the I/O interface card 32 via the I/O network 64. Each of the I/O carriers 36–40 is adapted to accommodate one or more I/O devices, such as the I/O interface cards 26–30, 34. For example, the I/O interface cards 26, 28, associated with the I/O carrier 36, are communicatively coupled to the remote field devices 48–54 via the I/O networks 66, 68. The I/O interface card 34 is communicatively coupled to the I/O carrier 40 via the I/O network 70. The I/O carrier 40 is connected to the I/O interface card 30 that is communicatively coupled to the remote field devices 56, 58 via the I/O network 72. The I/O networks 64, 70, which communicatively couple the I/O carriers 36–40 to the I/O interface cards, 32, 34 may be for example, High Speed Ethernet (HSE) networks or any other desired type of networks. These I/O devices can be configured to communicate using any desired communication protocol including, for example, the Fieldbus® Foundation HSE communication protocol.

The process controllers 12, 14 implement or oversee process control routines stored therein or otherwise associated therewith and communicate with field devices 42–58 and the operator station 16 to control a process in any desired manner. Typically, when the process controller 12, 14 issues a command to one of the field devices 42–58, the process controller 12, 14 transmits the command to the appropriate I/O device. If the I/O device receiving the command is the I/O interface card 22, 24, the I/O interface card 22, 24 transmits the command to the appropriate field device 42–46 on the I/O network 60, 62. If the I/O device receiving the command is the I/O interface card 32, the I/O interface card 32 transmits the command to the appropriate I/O carrier 36, 38 on the I/O network 64. If the command is intended for one of the field devices 48–54 on the I/O networks 66, 68, the I/O carrier 36 transmits the command to the appropriate I/O interface card 26, 28 which, in turn, transmits the command to the appropriate field device 48–54. If the field device 56, 58 is not coupled to an I/O interface card 26, 28 associated with the I/O carrier 36, the I/O carrier 36 transmits the command to the I/O interface card 34 which transmits the command to a further I/O carrier 40 on the I/O network 70. Likewise, the I/O carrier 40 transmits the command to the appropriate I/O interface card 30 which, in turn, transmits the command to the appropriate field device 56, 58 over the I/O network 72.

The field devices 42–58 used within the process control system 10 may be any types of devices, such as sensors, valves, transmitters, positioners, etc. while the I/O interface cards 22–34 and the I/O carriers 36–40 used may be any type of I/O device conforming to any desired communication or controller protocol. In the embodiment illustrated in FIG. 1, the local field device 46 and the remote field device 48 are smart devices, such as PROFIBUS® field devices, that communicate over digital buses. The local field device 46 communicates over the I/O network 62, a digital bus, to the I/O interface card 24, while the remote field device 48 communicates over the I/O network 66, a digital bus, to the I/O interface card 26 on I/O carrier 36. The local field devices 42, 44 and the remote field devices 50–58 are smart devices, such as Fieldbus field devices, that communicate over I/O networks 60, 68, 72, digital buses, to I/O interface cards 22, 28, 30 using the Fieldbus communication protocol. The I/O carriers 36–40 are HSE I/O carriers that communicate over HSE I/O networks 64, 70 to HSE I/O interface cards 32, 34 using the Fieldbus HSE Ethernet communication protocol. Of course other protocols and types of I/O networks and I/O devices could be used instead of or in addition to those described above.

The process control system 10 is configured to create and store a unique network identification tag for each of the I/O networks 60–72 such that a diagnostics tool 74 can be communicatively coupled to a selected I/O network 60–72 to retrieve the network identification tag. The unique network identification tag may be chosen and assigned in any desired manner, such as using a preset list of unique names, allowing an operator to assign unique names to each of the devices associated with each I/O network, concatenating names and/or addresses of devices providing a communication link from the operator station to each I/O network to create unique network identification tags, etc. As mentioned previously, each of the I/O interface cards 22–34 is associated with one of the I/O network 60–72. For example, the I/O interface cards 22, 24, 26, 28, 30, 32, 34 are associated with the I/O networks 60, 62, 66, 68, 72, 64, 70 respectively. The I/O networks 60–72 are generally used to couple the field devices 42–58 to the I/O interface cards 22–30 and I/O devices, such as I/O carriers 36–40 to the I/O interface cards 32, 34. When it is desirable to add or replace one of the field devices 42–58 or I/O carriers 36–40 within the process control system 10, the diagnostics tool 74 can be connected to a selected I/O network 60–72 to retrieve the I/O network's network identification tag. Plant personnel can then use the retrieved the network identification tag to determine whether they have located the appropriated I/O network 60–72 prior to connecting the field device 42–58 or I/O device 36–40 to the I/O network 60–72 thereby reducing the possibility of wiring mistakes.

In the illustrated embodiment, an operator uses one or more routines to configure the process controllers 12, 14 with unique controller identification tags such as "CNTR1" and "CNTR2." The one or more routines may be stored in a single device or distributed throughout a number of devices such as for example, in the user interface 16, in one or more process controller memories and/or in one or more I/O devices. The process controllers 12, 14 are typically configured at installation. Each of the process controllers 12, 14 is associated with an I/O bus 18, 20 provided with four I/O slots, where each slot is adapted to accommodate an I/O device, such as an I/O interface card 22, 24, 32. The process controllers 12, 14 are configured to recognize when an I/O device is installed within an I/O slot on its I/O bus 18, 20 and to automatically create a device identification tag for the newly installed I/O device. For example, the process controller 12 "CNTR" assigns a device identification tag of "C01" to the I/O interface card 22 installed on slot one of the I/O bus 18. Similarly, the process controller 14 "CNTR2" may, for example, assign a device identification tag of "C01" to the I/O interface card 24 installed on slot one of the I/O bus 20 and a device identification tag of "C04" to the I/O interface card 32 installed on slot four of the I/O bus 20.

Each process controller 12, 14 then combines its own unique controller identification tag with the device identification tag for each of the I/O devices 22, 24, 32 to create a unique network identification tag for the I/O network 60, 62, 64 associated with each of the I/O devices 22, 24, 32. For example, the process controller 12 combines its own unique controller identification tag of "CNTR1" with the device identification tag of "C01" for the I/O interface card 22 to create a unique network identification tag of "CNTR1/C01" for the I/O network 60 associated with the I/O interface card 22. The process controller 14 combines its own controller identification tag of "CNTR2" with the device identification tag of "C01" for I/O interface card 24 to create a unique network identification tag of "CNTR2/C01" for the I/O network 62 associated with the I/O interface card 24. Similarly, the process controller 14 "CNTR2" creates a unique network identification of "CNTR2/C04" for the I/O network 64 associated with the I/O interface card 32. Alternatively, the configuration software may be run in for example, the operator station 16 to create unique network identification tags for each of the I/O networks 60–72. Of course, the process controllers 12, 14 or the configuration software may combine the identification tags in any other desired manner to create unique network identification tags.

The process controllers 12, 14 continue creating network identification tags for each of the I/O networks 66–72. The process controllers 12, 14 are configured to recognize when the I/O carrier 36, 38 is communicatively coupled to the I/O interface card 32 and to create a carrier identification tag for each of the I/O carriers 36, 38 based on, for example, the order that they are connected to the I/O interface card 32. For example, the process controller 14 creates a carrier identification tag of "CA1" for the I/O carrier 36 and a carrier identification tag of "CA2" for the I/O carrier 38. Then, as each of the I/O interface cards 26, 28, 34 is installed on a particular slot of the I/O carriers 36, a device identification tag is automatically assigned to the I/O interface cards 26, 28, 34 based on the I/O slot occupied by the I/O device 26, 28, 34. For example, the I/O interface card 26 disposed in slot one of the I/O carrier 36 is assigned a device identification tag of "C01," the I/O interface card 28 disposed in slot two of the I/O carrier 36 is assigned a device identification tag of "C02" and the I/O interface card 34 disposed in slot five of the I/O carrier 36 is assigned a device identification tag of "C05."

The process controller 14 then combines its own unique controller identification tag of "CNTR2," the device identification tag of "C04" for the I/O interface card 32, the carrier identification tag of "CA1" for the I/O carrier 36 and the device identification tag of "C01" for the I/O interface card 26 to create a unique network identification tag of "CNTR2/C04/CA1/C01" for the I/O network 66. For the I/O network 68, the process controller 14 combines its unique controller identification tag "CNTR2," the device identification tag of "C04" for the I/O interface card 32, the carrier identification tag of "CA1" for I/O carrier 36 and the device identification tag of "C02" for the I/O interface card 28 to create a unique network identification tag of "CNTR2/C04/CA1/C02." Similarly, the process controller 14 creates a unique network identification tag of "CNTR2/C04/CA1/C05" for the I/O network 70 associated with the I/O interface card 34.

As described above, when the I/O carrier 40 is communicatively coupled to the I/O interface card 34, the process controller 14 assigns the I/O carrier 40 a carrier identification tag of "CA1." The I/O devices installed on the I/O carrier 40 are assigned device identification tags based on the slot on the I/O carrier 40 occupied by the I/O device. For example, the I/O interface card 30, installed in slot two of the I/O carrier 40 is assigned a device identification tag of "C02." The process controller 14 combines its unique controller identification tag of "CNTR2," the device identification tag of "C04" for the I/O interface card 32, the carrier identification tag of "CA1" for the I/O carrier 36, the device identification tag of "C05" for the I/O interface card 34, the carrier identification tag of "CA1" for the I/O carrier 40 and the device identification tag of "C02" for the I/O interface card 30 to create a unique network identification tag of "CNTR2/C04/CA1/C05/CA1/C02" for the I/O network 72. Although the preferred embodiment describes the process controllers 12, 14 as performing the functions associated with the creation of the network identification tags, in alternate embodiments the different I/O devices, such as the I/O interface cards 22–34, the I/O carriers 36–40, or the operator station 16, etc. may perform the one or more of the functions of combining or concatenating the different identification tags to create the unique network identification tag for the I/O network 60–72. Additionally, it should be understood that while the illustrated embodiment describes a particular method for assigning a unique network identification tag for an I/O network in a process control system, alternative methods of creating a unique network identification tag are also considered to be within the scope of the invention. For example, each of the I/O networks may be assigned a unique network identification tag based on an address or a unique name assigned to the I/O device associated with an I/O network. Any other random or non-random method of assigning identities to I/O networks may be used.

In the illustrated embodiment, the network identification tag for each I/O network 60–72 is generally stored in the associated I/O device 22–34. For example, the network identification tag "CNTR1/C01" is stored in the memory of the I/O interface card 22. However, in alternative embodiments, the network identification tag may be stored in the memory of any device communicatively coupled to the I/O network, such as, for example, in the memory of a process controller communicatively coupled to the I/O network or in any one of the I/O devices communicatively coupled to I/O network associated with the network identification tag.

Once the network identification tag has been stored in the appropriate I/O device memory, the I/O device 22–34 is configured to periodically transmit the network identification tag on the I/O network 60–72. For example, the I/O interface card 32 periodically broadcasts the network identification tag of "CNTR2/C04" on the I/O network 64. This permits plant personnel to couple the diagnostics tool 74 to a selected I/O network 60–72 and to verify the identity of the I/O network 60–72 using the network identification tag prior to installing an I/O device or a field device onto the I/O network 60–72 which helps to minimize the possibility of wiring errors. In an alternative embodiment, the I/O device 22–34 transmits the network identification tag for an I/O network 60–72 in response to a request for the network identification tag from a diagnostics tool 74 (or other device) communicatively coupled to the I/O network 60–72. It should also be understood that the transmission of the network identification tag may originate in any one of the devices which are communicatively coupled to create the communication pathway from the operator station 16 to the I/O network associated with a particular network identification tag. Such devices may include the process controllers 12, 14, the I/O interface cards 22–34, the I/O carriers 36–40 or any other types of devices.

Figure 2:
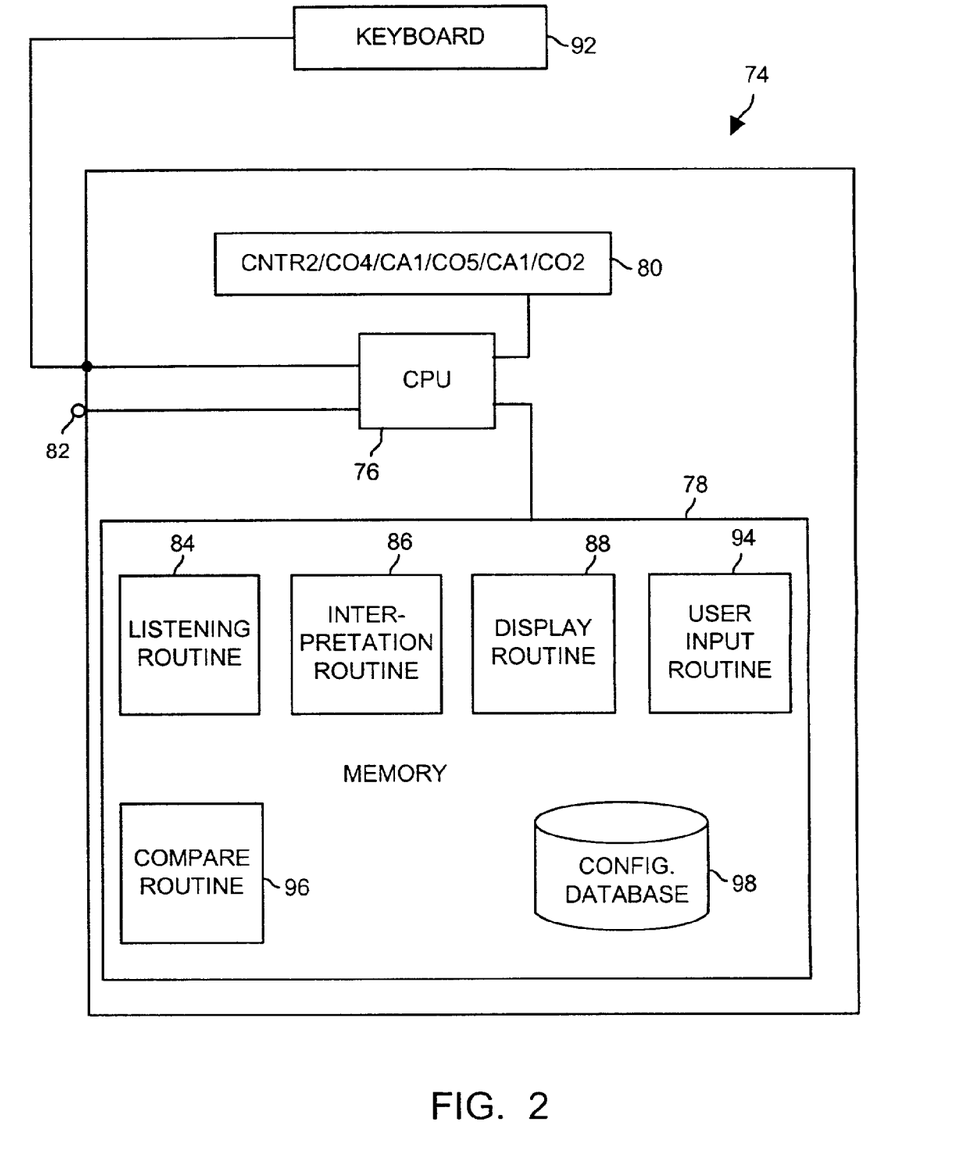
FIG. 2 is a block diagram of a portable diagnostics tool for identifying or locating a selected I/O network in the process control system of FIG. 1.

Referring now to FIG. 2, the diagnostics tool 74 for identifying I/O networks 60–72 in the process control system 10 is illustrated in more detail. Specific field devices 42–58 or I/O devices 36–40 are typically coupled to specific I/O networks 60–72 within the process control system 10. Installing the field device 42–58 or the I/O device 36–40 generally requires the identification of the appropriate I/O network 60–72 before a connection can be made. The diagnostics tool 74 is used to retrieve and display the network identification tag for a selected I/O network 60–72 so that plant personnel can determine whether the selected I/O network 60–72 is the correct I/O network 60–72 prior to connecting the field device 42–58 or the I/O device 36–40 to that network.

The diagnostics tool 74 may be, for example a standard laptop computer or a handheld computer generally including a processing unit 76, a memory 78, a display 80 and an input port 82. The input port 82 is adapted to be communicatively coupled to an I/O interface card 22–34 via the bus associated with the I/O network 60–72 using for example, an ethernet cable or any other network compatible cable or communication device. The memory 78 generally includes a number of software routines that implement the functions of the diagnostics tool 74. Once the diagnostics tool 74 is communicatively coupled to the I/O interface card 22–34 via the selected I/O network 60–72 using the input port 82, a listening routine 84 listens for the network identification tag that is periodically broadcast on the I/O network 60–72. Once the network identification tag for the selected I/O network 60–72 is received, the network identification tag is routed to an interpretation routine 86 that uses the I/O device communication protocol to translate the received network identification tag to a diagnostics tool specific protocol. The translated version of the network identification tag is then routed to a display routine 88 that displays the identity of the I/O network 60–72 associated with the received network identification tag. The identity of the I/O network 60–72 may be displayed in any desired format or manner. For example, if the diagnostics 74 is connected on the I/O network 70, the listening routine 84 listens for the periodic transmission of the network identification tag "CNTR2/C04/CA1/C05" by the I/O interface card 34. Upon receiving the network identification tag, the listening routine 84 routes the network identification tag to the interpretation routine 86 which identifies the communication protocol used by I/O interface card 34 and translates the received network identification tag into the diagnostics tool specific protocol. The translated network identification tag is routed to the display routine 88 which may display the network identification tag as "CNTR2/C04/CA1/C05" on the display 80. While in the illustrated example, the network identification tag is displayed, any other indication of the I/O network 60–72 associated with the network identification tag may be displayed using, for example, a configuration diagram of the process control system 10.

In an alternative embodiment, the listening routine 84 and may be replaced with a query routine that first identifies the communication protocol used by the I/O interface card 22–34 associated with the selected I/O network 60–72 and then issues a request to the I/O interface card 22–34 for the network identification tag in the identified communication protocol. Upon receipt, the network identification tag is routed to the interpretation routine 86. If the listening routine 84 fails to receive a network identification tag within a specific period of time, the listening routine 84 instructs the display routine 80 to provide an indication that a non-I/O network has been selected.

The diagnostics tool 74 may be provided with the option of accepting a user provided network identifier for the I/O network 60–72 required for connection to the field device 42–58 or the I/O carrier 36–40 as an input. In this case, the diagnostics tool compares the I/O network 60–72 associated with the user provided network identifier with the I/O network 60–72 associated with the network identification tag received over the selected I/O network 60–72 to determine whether the selected I/O network 60–72 is the correct I/O network 60–72 for connecting the field device 42–58 or I/O carrier 36–40.

More specifically, the diagnostics tool 74 may be provided with an input device, such as a keyboard 92 that can be used by plant personnel to input the network identifier of the I/O network required for connection to the field device 42–58 or I/O carrier 36–40. The network identifier may be provided in the form of the network identification tag for the I/O network 60–72. Of course, the user may be able to select an I/O network 60–72 from a configuration diagram or list, enter a specific I/O network 60–72 via the keyboard 92 or specify the I/O network 60–72 in any other desired manner. A user input routine 94 accepts and stores the user provided network identifier. The user routine 94 may also cross reference the user provided network identifier in a configuration database 98 to determine the identity of the I/O network 60–72 associated with the network identifier. Once the interpretation routine 86 completes the translation of the received network identification tag into a diagnostics tool specific protocol, the translated network identification tag is routed to a compare routine 96. The compare routine 96 compares the identity of the I/O network 60–72 associated with the user provided network identifier with the identity of the I/O network 60–72 associated with the received network identification tag. If the identity of the I/O network 60–72 associated with the received network identification tag matches the identity of the I/O network 60–72 associated with the user provided network identifier, the compare routine 96 instructs the display routine 88 to indicate that the correct I/O network 60–72 has been selected. If the identity of the I/O network 60–72 associated with the received network identification tag fails to match the identity of the I/O network 60–72 associated with the user provided network identifier, the compare routine 96 instructs the display routine 88 to indicate that an incorrect I/O network 60–72 has been selected and may identify that I/O network 60–72, if possible.

The disclosed method and system permits plant personnel to verify whether the correct I/O network 60–72 under the control of the correct process controller 12, 14 has been selected prior to connecting a new or previously disconnected field device 42–58 or I/O device such as an I/O carrier 36–40 to that I/O network. While the system for determining whether the selected I/O network 60–72 is the correct I/O network in a process control system 10 has been described herein as including functionality implemented by one or more programs or routines in a processor and memory, it will be understood that this system can be constructed as any type of device and that the different elements of this system can be produced in or implemented in hardware, firmware or software stored on any type of computer memory, disk, or other storage device. If implemented in software, the system could be programmed using any desired programming language, and may be implemented in a standard multi-purpose central processing unit or on specifically designed hardware or firmware such as, for example, an ASIC, if so desired. When implemented in software, the software may be stored in any computer readable memory such as on a magnetic disk, a laser disk, an optical disk, or other storage medium, in RAM or ROM of a computer or processor, etc. Likewise, this software may be delivered to a user or a device within a process control system via any known or desired delivery method including, for example, on a computer readable disk or other transportable computer storage mechanism or modulated over a communication channel such as a telephone line, the Internet, a satellite link, a cellular link, etc. (which are viewed as being the same as or interchangeable with providing such software via a transportable medium).

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for use in a process control system having a plurality of input/output (I/O) networks, the method comprising the steps of:

creating a first unique network identification tag for a first one of the I/O networks;

creating a second unique network identification tag for a second one of the I/O networks;

storing the first network identification tag in a first device communicatively coupled to the first I/O network;

storing the second network identification tag in a second device communicatively coupled to the second I/O network;

identifying the first I/O network with the first network identification tag by transmitting from the first device the first network identification tag on the first I/O network;

identifying the second I/O network with the second network identification tag by transmitting from the second device the second network identification tag on the second I/O network;

accepting a user provided network identifier for a selected I/O network as an input;

storing the user provided network identifier;

receiving the first network identification tag from the first I/O network comparing the identity of the I/O network associated with the user provided network identifier with the identity of the I/O network associated with the first network identification tag:

generating a first indication if the identity of the I/O network associated with the first network identification tag matches the identity of the I/O network associated with the user provided network identifier; and generating a second indication if the identity of the I/O network associated with first network identification tag does not match the identity of the I/O network associated with the user provided network identifier.

2. The method of claim 1, wherein the step of creating the first unique network identification tag for the first I/O network includes the steps of creating identification tags for two or more devices, wherein the devices are communicatively coupled to create a communication pathway from a user interface to the first I/O network; and combining the identification tags for each of the two or more devices to create the first network identification tag.

3. The method of claim 2, wherein the step of combining the identification tags includes the step of concatenating the identification tag for each of the two or more devices to create the first network identification tag.

4. The method of claim 2, further including the step of creating a unique identification tag for at least one of the two or more devices.

5. The method of claim 1, wherein the step of creating the first network identification tag for the first I/O network includes the steps of:
creating a first unique identification tag for a first device communicatively coupled to an user interface and to the first I/O network; and
using the first identification tag to create the first network identification tag.

6. The method of claim 5, wherein the step of creating the first unique identification tag for the first device includes the step of creating the first unique identification tag for a process controller communicatively coupled to the user interface and to the first I/O network.

7. The method of claim 5, wherein the step of creating the first unique identification tag for the first device includes the step of creating the first unique identification tag for an I/O device communicatively coupled to the user interface and to the first I/O network.

8. The method of claim 5, wherein the step of creating the first unique network identification tag for the first I/O network includes the steps of
creating a second identification tag for a second device communicatively coupled to the first device and to the first I/O network; and
using the second identification tag to create the first network identification tag.

9. The method of claim 8, wherein the step of creating the first network identification tag for the first I/O network includes the step of concatenating the first identification tag and the second identification tag to create the first network identification tag.

10. The method of claim 1, wherein the step of storing the first network identification tag in the first device communicatively coupled to the first I/O network includes the step of storing the first network identification tag in a process controller communicatively coupled to the first I/O network.

11. The method of claim 1, wherein the step of storing the first network identification tag in the first device communicatively coupled to the first I/O network includes the step of storing the first network identification tag in an I/O device communicatively coupled to the first I/O network.

12. The method of claim 11, wherein the step of storing the first network identification tag in the I/O device communicatively coupled to the first I/O network includes the step of storing the first network identification tag in an I/O interface card communicatively coupled to the first I/O network.

13. The method of claim 11, wherein the step of storing the first network identification tag in the I/O device includes the step of storing the first network identification tag in an I/O carrier communicatively coupled to the first I/O network.

14. The method of claim 1, wherein the step of making the first network identification tag available on the first I/O network includes the step of transmitting the first network identification tag on the first I/O network in response to a request for the first network identification tag.

15. The method of claim 1, wherein the step of making the first network identification tag available on the first I/O network includes the step of periodically transmitting the first network identification tag on the first I/O network.

16. The method of claim 1, further including the steps of communicatively coupling a diagnostics tool and the first I/O network; and accessing the first network identification tag via the diagnostic tool.

17. The method of claim 16, wherein the step of accessing the first network identification tag includes the step of issuing a request for the first network identification tag on the first I/O network.

18. The method of claim 16, wherein the step of accessing the first network identification tag includes the step of listening for the first network identification tag on the first I/O network.

19. The method of claim 16, further including the step of identifying a communication protocol for the first I/O network.

20. The method of claim 16, further including the steps of:
interpreting the received first network identification tag; and
providing an indication representative of the identity of the first I/O network on the diagnostic tool.

21. The method of claim 20, wherein the step of providing the indication representative of the identity of the first I/O network includes the step of displaying the first network identification tag on the diagnostic tool.

22. The method of claim 20, wherein the step of providing the indication representative of the first I/O network includes the step of displaying the first I/O network within a configuration diagram.

23. A process control system comprising:
a user interface;
one or more process controllers communicatively coupled to the user interface and to a plurality of I/O networks including a first I/O network and a second I/O network;
a first unit communicatively coupled to the first I/O network and adapted to store a first unique network identification tag for the first I/O network and to identify the first I/O network by communicating the first unique network identification tag on the first I/O network;
a second unit communicatively coupled to the second I/O network and adapted to store a second unique network identification tag for the second I/O network and to identify the second I/O network by communicating the second unique network identification tag on the second I/O networked
a third unit coupled communicatively coupled to a selected one of the plurality of the I/O networks and adapted to:
receive a first indication from the selected one of the plurality of the I/O networks, the first indication identifying, the selected one of the plurality of the I/O networks;
store the first indication;
accept the first unique network identification tae as an input;
store the first unique network identification tag;
compare the first indication with the first unique network identification tag;
generate a first indicator if the first indication matches the first unique network identification tag; and
generate a second indicator if the first indication does not match the first unique network identification tag.

24. The process control system of claim 23, wherein the first unit includes a routine adapted to be implemented on a processor to create the first network identification tag.

25. The process control system of claim 23, wherein the first unit includes a routine adapted to be implemented on a processor to ascertain identification tags for each of two or more devices, wherein the two or more devices are communicatively coupled to create a communication pathway from the user interface to the first I/O network.

26. The process control system of claim 25, wherein the routine combines the identification tags for each of the two or more devices to create the first network identification tag.

27. The process control system of claim 26, wherein the routine concatenates the identification tags for each of the two or more devices to create the first network identification tag.

28. The process control system of claim 23, wherein the first unit includes a routine adapted to be implemented on a processor to ascertain a first unique identification tag for a first device communicatively coupled to the user interface and to the first I/O network and to use the first identification tag to create the first network identification tag.

29. The process control system of claim 28, wherein the first device comprises one of the one or more process controllers.

30. The process control system of claim 28, wherein the first device comprises an I/O device.

31. The process control system of claim 28, wherein the routine ascertains a second identification tag for a second device communicatively coupling the first device to the I/O network and uses the second identification tag to create the second network identification tag.

32. The process control system of claim 31, wherein the routine combines the first identification tag and the second identification tag to create the first network identification tag.

33. The process control system of claim 32, wherein the routine concatenates the first identification tag and the second identification tag to create the first network identification tag.

34. The process control system of claim 23, wherein the first unit comprises a memory and a routine adapted to be implemented on a processor within one of the one or more process controllers.

35. The process control system of claim 23, wherein the first unit includes an I/O device communicatively coupled to the first I/O network.

36. The process control system of claim 35, wherein the I/O device comprises an I/O interface.

37. The process control system of claim 35, wherein the I/O device comprises an I/O carrier.

38. The process control system of claim 23, wherein the first unit includes a routine adapted to be implemented on a processor to make the first network identification tag available on the first I/O network in response to a request for the first network identification tag on the first I/O network.

39. The process control system of claim 23, wherein the first unit includes a routine adapted to be implemented on a processor to communicate the first network identification tag on the first I/O network on a periodic basis.

40. The process control system of claim 23, wherein the first I/O network comprises a bus.

41. The process control system of claim 23, wherein the first I/O network comprises a bus adapted to support multiplexed communications.

42. The process control system of claim 23, further including a diagnostic tool adapted to be communicatively coupled to the first I/O network and includes a routine adapted to be implemented on a processor to access the first network identification tag on the first I/O network.

43. The process control system of claim 42, wherein the routine issues a request for the first network identification tag on the first I/O network.

44. The process control system of claim 42, wherein the routine listens for the first network identification tag on the first I/O network.

45. The process control system of claim 42, wherein the routine identifies the communication protocol for the first I/O network.

46. The process control system of claim 42, wherein the routine interprets the first network identification tag received on the I/O network and provides an indication identifying the first I/O network on the diagnostic tool.

47. The process control system of claim 46, wherein the routine displays the first network identification tag on the diagnostic tool.

48. The process control system of claim 46, wherein the routine displays the identity of the first I/O network within a configuration diagram.

49. A diagnostic tool for identifying a selected I/O network in a process control system having a plurality of I/O networks, wherein a device communicatively coupled to the selected I/O network is adapted to store a network identification tag identifying the selected I/O network and communicate the network identification tag on the selected I/O network, the diagnostic tool comprising:
  a port adapted to be communicatively coupled to the selected I/O network;
  a computer readable memory;
  a processor;
  a first routine stored on the computer readable memory and adapted to be implemented on the processor to receive the network identification tag from the selected I/O network; and
  a second routine stored on the computer readable memory and adapted to be implemented on the processor to identify which one of the plurality of I/O networks is the selected I/O network based on the received network identification tag;
  a third routine stored on the computer readable memory and adapted to be implemented on the processor to accept an indication of one of the plurality of I/O networks as an in input;
  a fourth routine stored on the computer readable memory and adapted to be implemented on the processor to compare the identity of the I/O network associated with the network identification tag received from the selected I/O network with an identity of the I/O network associated with the indication of the one of the plurality of the I/O networks;
  a fifth routine stored on the computer readable memory and adapted to be implemented on the processor to generate a first indication if the identity of the I/O network associated with the network identification tag received from the selected I/O network matches the identity of the I/O network associated with the indication of the one of the plurality of I/O networks; and
  a sixth routine stored on a computer readable memory and adapted to be implemented on the processor to generate a second indication if the identity of the I/O network associated with the network identification tag received from the selected I/O network does not match the identity of the I/O network associated with the indication of the one of the plurality of I/O networks.

50. The diagnostic tool of claim 49, wherein the first routine issues a request for the network identification tag over the selected I/O network.

51. The diagnostic tool of claim 49, wherein the first routine listens for the network identification tag being periodically transmitted on the selected I/O network.

52. The diagnostics tool of claim 49, further including a third routine stored on the computer readable memory and adapted to be implemented on the processor to identify a communication protocol used on the selected I/O network.

53. The diagnostics tool of claim 49, further including a third routine stored on the computer readable memory and adapted to be implemented on the processor to provide an indication representative of the identity of the selected I/O network.

54. The diagnostics tool of claim 53, wherein the third routine displays the received network identification tag on the diagnostic tool.

55. The diagnostic tool of claim 53, wherein the third routine displays the identity of the I/O network associated with the received network identification tag using a configuration diagram.

56. The diagnostic tool of claim 53, wherein the third routine identifies the I/O network associated with the received network identification tag using a network configuration database.

57. A method for use in a process control system having a plurality of input/output (I/O) networks, the method comprising the steps 0
creating a plurality of unique identification tags for the plurality of I/O networks, respectively;
sending a transmission over a selected I/O network of the plurality of I/O networks to identify the selected I/O network via a respective unique identification tag of the plurality of unique identification tags for the selected I/O network;
accepting a user provided network identifier for a first one of the I/O networks from the plurality of I/O networks as an input;
storing the user provided network identifier;
receiving a one of the unique identification taps from a second one of the I/O networks from the plurality of I/O networks and distinct from the first I/O network;
comparing the one of the unique identification tags received from the second one of the I/O networks with the user provided network identifier;
generating a first indication to the user if the second one of I/O networks associated with the one of the unique identification tags matches the identity of the first one of the I/O networks associated with the user provided network identifier; and
generating a second indication if the second one I/O network associated with the one of the unique identification tags does not match the identity of the second one of the I/O networks associated with the user provided network identifier.

58. The method of claim 57, further comprising the respective unique identification tag in a process controller of the process control system, wherein the process controller is communicatively coupled to the selected I/O network to support implementation of one or more process control routines.

59. The method of claim 57, wherein sending comprises periodically broadcasting the transmission on the selected I/O network.

60. The method of claim 57, wherein sending comprises responding to a request for the transmission to identify the respective unique identification tag.

* * * * *

UNITED STATES PATENT AND TRADEMARK OFFICE
CERTIFICATE OF CORRECTION

| | | |
|---|---|---|
| PATENT NO. | : 7,185,083 B2 | |
| APPLICATION NO. | : 09/761922 | |
| DATED | : February 27, 2007 | |
| INVENTOR(S) | : Daniel D. Christensen et al. | |

It is certified that error appears in the above-identified patent and that said Letters Patent is hereby corrected as shown below:

<u>On the Title Page:</u>

At field (57), line 13, "is response" should be -- in response --.

<u>In the Specification:</u>

At Column 8, lines 59-60, "routine 84 and may" should be -- routine 84 may --.

<u>In the Claims:</u>

At Column 11, line 63, "wherein the step of making the" should be -- wherein transmitting the --.

At Column 11, line 64, "tag available on" should be -- tag on --.

At Column 12, line 1, "wherein the step of making the" should be -- wherein transmitting the --.

At Column 12, line 2, "tag available on" should be -- tag on --.

At Column 12, line 59, "tae" should be -- tag --.

At Column 13, line 54, "make" should be -- communicate --.

At Column 13, lines 54-55, "tag available on" should be -- tag on --.

UNITED STATES PATENT AND TRADEMARK OFFICE
CERTIFICATE OF CORRECTION

PATENT NO. : 7,185,083 B2
APPLICATION NO. : 09/761922
DATED : February 27, 2007
INVENTOR(S) : Daniel D. Christensen et al.

It is certified that error appears in the above-identified patent and that said Letters Patent is hereby corrected as shown below:

At Column 15, line 29, "steps 0" should be -- steps: --.

Signed and Sealed this

Twenty-fifth Day of December, 2007

JON W. DUDAS
*Director of the United States Patent and Trademark Office*